United States Patent [19]
Dixon

[11] Patent Number: 4,508,138
[45] Date of Patent: Apr. 2, 1985

[54] POLYJET VALVE WITH BACKWASH

[75] Inventor: Robert W. Dixon, Concord, Calif.

[73] Assignee: Chas. M. Bailey Co., Inc., Emeryville, Calif.

[21] Appl. No.: 520,639

[22] Filed: Aug. 5, 1983

[51] Int. Cl.³ .......................... F16K 3/26; F16K 11/07
[52] U.S. Cl. .................................... 137/239; 137/546; 137/625.3; 137/625.38; 137/625.39; 138/45; 138/46; 251/205; 251/210; 251/121; 210/411; 210/427
[58] Field of Search ...................... 137/219, 239, 625.3, 137/625.38, 625.39, 599, 599.1, 544, 547, 549, 550; 251/121, 205, 210; 138/45, 46; 210/411, 427, 429

[56] References Cited
U.S. PATENT DOCUMENTS

| | | | |
|---|---|---|---|
| 3,605,787 | 9/1971 | Krogfoss et al. | 137/219 |
| 3,821,968 | 7/1974 | Barb | 137/625.3 |
| 4,036,248 | 7/1977 | Yoshimori et al. | 137/625.38 |
| 4,040,443 | 8/1977 | Okada et al. | 137/625.38 |
| 4,103,702 | 8/1978 | Duthion et al. | 137/625.3 |
| 4,244,388 | 1/1981 | Feiss | 137/116 |
| 4,375,821 | 3/1983 | Nanao | 137/625.39 |

Primary Examiner—George L. Walton
Attorney, Agent, or Firm—Lothrop & West

[57] ABSTRACT

A polyjet valve has an inlet opening into an inlet chamber normally communicating through a movable polyjet sleeve in variable amounts and in one direction with an outlet chamber having an outlet. There is a block to close the outlet and a conduit to establish backflow from the outlet chamber through the polyjet sleeve in the reverse direction and then to waste.

8 Claims, 2 Drawing Figures

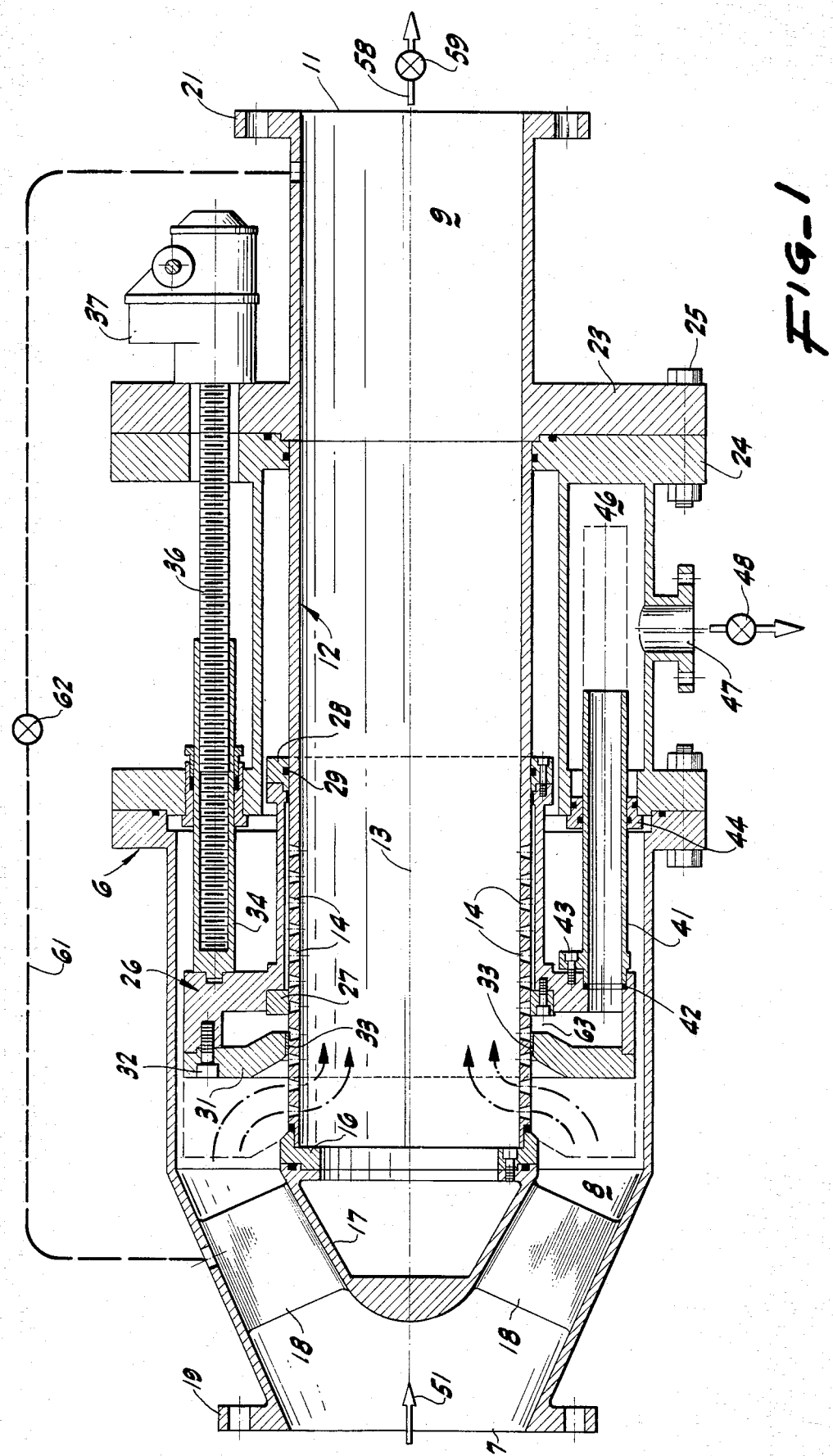

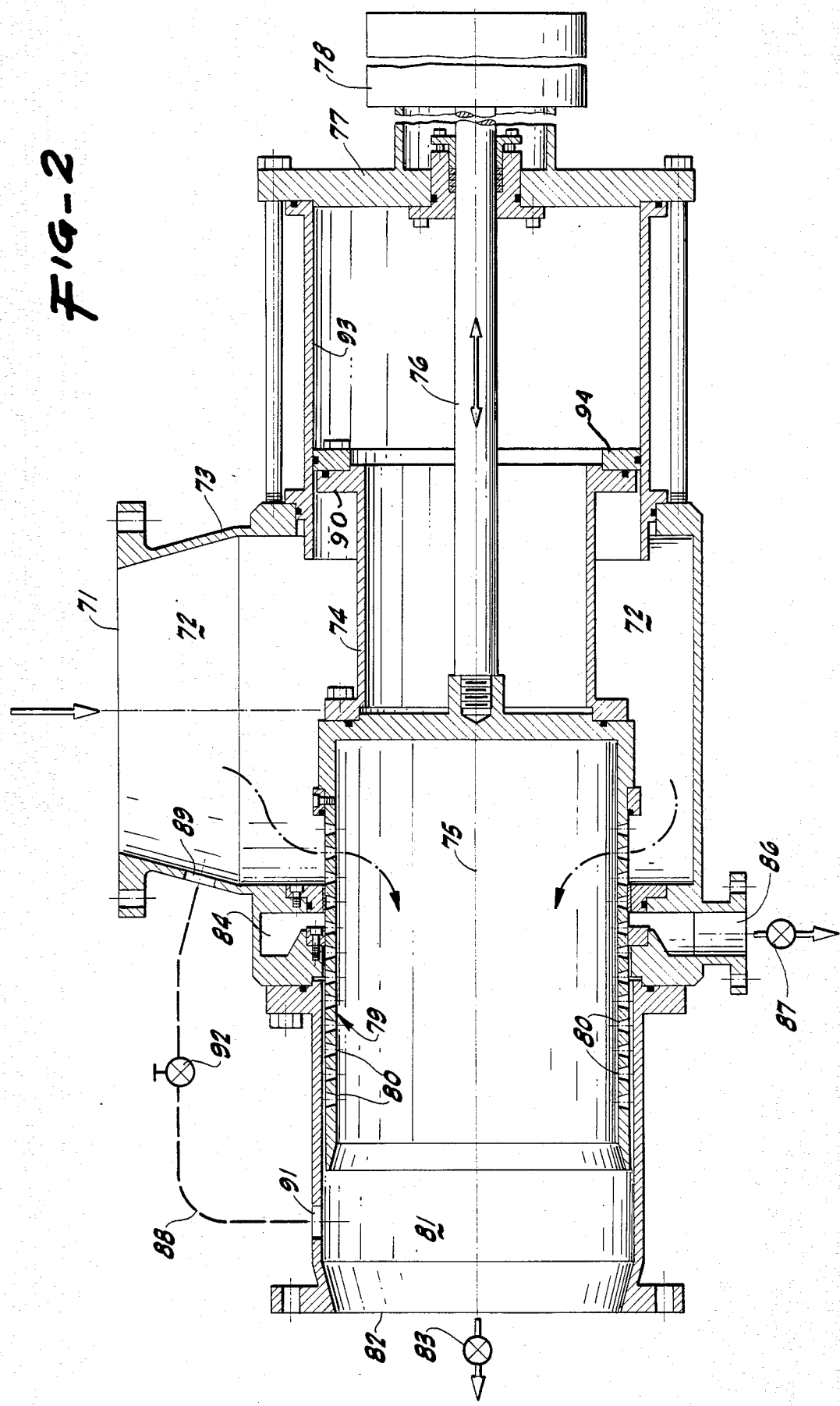

POLYJET VALVE WITH BACKWASH

BRIEF SUMMARY OF THE INVENTION

A polyjet valve has an inlet opening into an inlet chamber normally communicating through various polyjet openings in a cylindrical sleeve in variable amounts in one direction toward an outlet chamber having an outlet. There is a traveling ring surrounding the sleeve and movable to close the openings and an annular channel in the traveling ring to establish backflow from the outlet chamber progressively through different openings in the polyjet sleeve and into the annular channel open to some of said openings in the reverse direction and then to waste.

PRIOR ART

The most pertinent prior art known to me presently is U.S. Pat. No. 3,605,787 issued Sept. 20, 1971 to Ralph J. Krogfoss and myself for a polyjet valve. This valve is a fundamental portion of the current disclosure, but does not have any indication of the currently disclosed manners of maintaining, cleaning and backwashing the valve.

BRIEF DESCRIPTION OF THE SEVERAL VIEWS OF THE DRAWINGS

FIG. 1 is a longitudinal cross-section on two planes at right angles to each other through one form of polyjet valve according to the invention showing provisions for a backwash operation.

FIG. 2 is a similar cross-section of another form of polyjet valve pursuant to the invention showing another form of arrangement for effectuating a backwash function.

DETAILED DESCRIPTION

In the embodiment shown in FIG. 1 there is provided a valve body 6 made up of various component portions having an inlet 7 opening into an inlet chamber 8 and communicating with an outlet chamber 9 having an outlet 11. Intermediate the chambers 8 and 9 there is a polyjet sleeve 12 symmetrical about a longitudinal axis 13 and inclusive of a very large number of jet openings 14, preferably of tapering cross-section, with the wider or larger portion toward the outside of the valve and the smaller or narrower portion toward the inside of the valve. These are axially spaced and extend radially and circumferentially in a pattern preferably as disclosed in U.S. Pat. No. 3,605,787.

The sleeve is preferably supported at one end through a ring 16 in engagement with a nose cone 17 joining the remainder of the body by means of intervening vanes 18 spaced apart to allow free fluid flow. The walls of the chamber 8 merge with an inlet flange 19 for securing the body 6 to an adjoining hydraulic conduit (not shown) by means of the customary fastenings. The outlet chamber 9 is within a portion of the main body 6 having an attachment flange 21 with a provision for securing the body 6 to another structure such as an outlet conduit. The body 6 also incorporates flanges 23 and 24 held together by bolts 25 so as to afford a detachable assembly.

Movable over the outside of the sleeve 12 is an axially traveling ring 26 inclusive of bearings 27 and 28 movable on the outside of the sleeve, the bearing 28 being provided with a packing or O-ring 29. The ring bearings 27 and 28 are supplemented by a bearing ring 31 secured to the traveling ring 26 by removable fastenings 32 and having an anti-friction lining 33. To move the traveling ring 26 there is provided an internally threaded sleeve 34 secured to the ring and in interengagement with a screw 36 that is rotated by a driver 37, shown diagrammatically.

Preferably there are two diametrically opposite ring moving devices such as the sleeve 34, the screw 36 and the impeller 37. Intermediate such devices, preferably also on a diameter, are tubes 41 at one end tightly secured to the ring 26 by means of a packing ring 42 and a fastening hub 43. The tube 41 extends slidably through a packing structure 44 and telescopes into a drain chamber 46 incorporated within the body 6 and having a drain opening 47 controlled by a manual valve 48.

In the normal operation of this structure, fluid under pressure is introduced through the inlet 7 and flows in the direction of the arrow 51 into the annular space between the wall of the body and the inner sleeve 12. In the event one or more of the openings 14 is uncovered, the liquid then flows through the openings 14 to the interior of the sleeve 12 and then flows in an axial direction to the outlet chamber 9. From there, flow continues through the outlet 11 usually into a connected pipe or conduit 58 controlled by a normally open valve 59, the outlet flow being in the direction of the arrow.

When the actuating drivers 37 are energized, the screws 36 are rotated and the threaded sleeves 34 and the traveling ring 26 are moved axially, either to uncover additional ones of the openings 14 or to cover some or all of the openings. By thus traversing the traveling ring 26 in an axial direction, the amount of flow through the valve can be controlled, depending upon the number of the openings 14 that are made available.

While the valve operates admirably for the control of flow quantities under most all circumstances, there are some installations in which there is sufficient debris in the liquid to clog the openings 14.

To overcome the difficulty a special provision is made. There is an arrangement for backwashing the openings. The flow direction is temporarily reversed. To arrange for backwashing, the valve 59 is easily closed to seal off the outlet 11. Liquid from the inlet chamber 8 is directed to flow through a shunting line 61 through a control valve 62 to the closed off outlet chamber 9. The shunted liquid flows through the center or interior portion of the polyjet sleeve 12 and radially outwardly through the openings 14 in a direction the reverse of normal flow. Fluid flows through the then-exposed ones of the openings 14 into an annular groove 63 within the traveling ring 26. Flow is from that groove 63 through the tubes 41 into the draining chamber 46 and from there through the outlet 47, since the valve 48 is correspondingly opened. This outflow goes to waste. By traversing the axially relatively short or narrow annular groove 63 over the longer array of openings, the flushing pressure is concentrated on a few holes at a time affording good cleansing action. By traversing the traveling ring along the length of the polyjet sleeve 12, all of the openings 14 are sequentially are exposed to the backflow liquid. The entire sleeve 12 is thus purged of any debris. The control valves can be returned to normal positions and the usual flow can be resumed.

In the embodiment of the invention disclosed in FIG. 2 there is similarly provided an inlet 71 to an inlet chamber 72 at one end of a valve body 73 made up of various different portions. The inlet chamber 72 extends around a sleeve 74 movable along an axis 75 by means of an axial propelling rod 76. The rod extends through a bearing and packing gland in an end plate 77 secured to a separable part of the body 73 and connects to an actuating structure 78. The rod 76 can be moved to and fro and the sleeve 74 moves with it. The sleeve 74 is joined to a coaxial polyjet sleeve 79. The polyjet sleeve 79 for much of its length is provided with a number of individual polyjet openings 80 usually affording flow from the inlet chamber 72 into the interior of the polyjet sleeve 79. This usually is in communication with an outlet chamber 81 having an outlet 82 adapted to be secured to any connecting structure (not shown) and preferably is provided with a closure valve 83.

The valve body 73 is inclusive of an enclosed annular groove 84 surrounding a fraction of the oxide length of the polyjet sleeve 79. From the annular groove 84 is an outlet 86 controlled by a valve 87 and going to waste.

There is a shunt line 88 having one end connected through an opening 89 to the inlet chamber 72 and having its other end going through an opening 91 to the outlet chamber 81. A valve 92 regulates or controls flow through the shunt line 88. The sleeve 74, opposite the end connected to the polyjet sleeve 79, has a terminal flange 90 slidable in a cylinder 93 compressed between the valve body 73 and the end plate 77. A bearing ring 94 carrying an O-ring and abutting an O-ring affords a substantially non-leaking arrangement.

In the normal operation of this structure, pressure fluid from the inlet chamber 72 flows through whatever openings 80 are available or uncovered. Flow is then into the interior of the polyjet sleeve 79. When the valve 83 is open, flow continues through the outlet 82. The valves 87 and 92 are normally closed, so there is no shunt flow and no flow to waste. In order to accomplish backwashing, the waste valve 87 is opened, the outlet valve 83 is closed and the shunt valve 92 is opened. Pressure fluid from the inlet chamber 72 then passes through the opening 89 and through the shunt line 88 and through the opening 93 into the chamber 81. There is then flow radially outwardly through whatever small number of the openings 80 are momentarily in communication with the relatively narrow annular groove 84. This flow through the openings 80 is contrary to the normal direction of flow. The outflow into the annular groove 84, as the polyjet sleeve 79 is moved axially to and fro, goes out to waste through the temporarily open valve 87. In this way a few at a time of the various openings in the polyjet sleeve are individually and progressively subjected to a liquid pressure flow through them contrary to the normal direction of flow. Debris lodged therein due to flow in the normal direction is subjected to a reverse flow and is dislodged and discharged from the outlet 86.

I claim:

1. A valve comprising a body including means defining an inlet chamber disposed about an axis; means defining an outlet chamber disposed about said axis and adapted to communicate with said inlet chamber; a cylindrical polyjet sleeve disposed between said chambers and extending along said axis and having a plurality of radially extending, circumferentially arranged, axially spaced discrete openings therethrough and adapted to communicate with said inlet chamber and said outlet chamber, each of said openings having a predetermined axial length; a ring coaxial with and engaging said sleeve and defining an annular groove open to said sleeve and of substantially said predetermined axial length; means for moving said polyjet sleeve and said ring relative to each other along said axis for moving individual ones only of said openings progressively into registry with said annular groove regardless of the position of said ring; means for substantially blocking outflow from said outlet chamber; means for providing a drain from said annular groove; and means for circulating wash fluid from said inlet chamber into said outlet chamber and through successive individual ones only of said openings into said annular groove regardless of the position of said ring and into and through said drain.

2. A valve as in claim 1 in which each of said openings is tapered along its own axis with the smaller end opening into the interior of said cylindrical polyjet sleeve, and means for directing said wash fluid to flow through said openings from the larger end thereof toward the smaller end thereof.

3. A valve comprising means defining an inlet chamber symmetrical about a main axis, means defining an outlet chamber having an outlet and symmetrical about said main axis and at least in part telescoped with said inlet chamber, a circular-cylindrical polyjet sleeve symmetrical about said main axis and on one side open to said inlet chamber and on the other side open to said outlet chamber, means defining a plurality of axially spaced openings through said polyjet sleeve adapted to communicate with said inlet chamber and said outlet chamber, each opening having an individual axial length of a predetermined amount, a ring engaging said sleeve, means defining an annular groove in said ring open to said sleeve and circular-cylindrical about said main axis and of only said predetermined axial length, means for moving said sleeve and said ring axially relative to each other to move only individual ones of said openings progressively into registry with said annular groove, means for directing water to flow from said inlet chamber into said outlet chamber through said polyjet openings in one direction, means for closing said outlet, means for directing water in an opposite direction to flow from said closed outlet chamber through successive ones only of said polyjet openings into said annular groove when said sleeve and said ring move relative to each other regardless of the position of said ring, and means for conducting the water from said annular groove to drain.

4. A valve comprising a valve body symmetrical about a main axis and having an upstream inlet at one end and a downstream outlet at the other end, means for closing said outlet, means within said valve body defining an annular groove symmetrical about said axis and of a predetermined axial length, a circular-cylindrical polyjet sleeve within said body and axially movable relative to and across said annular groove, means in said polyjet sleeve defining a plurality of openings, each opening having said predetermined axial length and being disposed with its own axis substantially normal to said main axis and said openings being spaced apart along said main axis to direct water to flow from said inlet to said outlet in one direction, a drain outlet from said annular groove, means for closing said outlet, and means for directing water to flow away from said outlet when said outlet is closed and through successive individual ones of said openings in said polyjet sleeve into said annular groove regardless of the position of said sleeve and then into said drain outlet.

5. A valve comprising a body having an inlet means and an outlet means, means to closing said outlet means, a circular-cylindrical sleeve substantially symmetrical about a main axis and having a plurality of individual axially spaced openings therethrough, each of said annular openings having its own individual axis disposed substantially normal to said main axis, means for progressively subjecting substantially all of said openings to simultaneous water flow therethrough in one direction along said individual axes thereof, and annular means surrounding said cylindrical sleeve for progressively subjecting only one of said annular openings to water flow therethrough in the opposite direction along said individual axes thereof when said outlet means is closed regardless of the position of said sleeve during linear movement of said sleeve.

6. A valve comprising a body having a water inlet and having a closable water outlet, a circular-cylindrical sleeve within said body and open on one side of said sleeve to said water inlet and open on the other side of said sleeve to said water outlet, means defining a plurality of annular openings through and axially spaced apart along said sleeve, and means for directing water from said inlet to flow in a preterrmined direction through all of said openings, annular means surrounding said cylindrical sleeve effective when said outlet is closed for directing water to flow only through progressively selected ones of said openings in a direction opposite to said predetermined direction regardless of the position of said sleeve during linear movement of said sleeve, and means for draining from said valve water flowing in said opposite direction through said selected ones of said openings.

7. A valve having a body with an inlet adapted to receive the flow of water and an outlet adapted to exit the flow of water, means for closing said outlet means within said body between said inlet and said outlet and including a polyjet sleeve extending axially and having a plurality of axially discrete openings therethrough, each opening being of a predetermined axial dimension and arranged along a predetermined length of said polyjet sleeve, means in said body defining an annular groove surrounding said polyjet sleeve, said groove and said openings having substantially the same said predetermined axial dimension, means connecting said annular groove to waste, and means for relatively moving said polyjet sleeve and said annular groove in one direction to direct the flow of water from said inlet to said outlet through substantially all of said openings and in an opposite direction to connect only one of said openings in sequence to said annular groove regardless of the position of said sleeve relative to said groove when said outlet is closed.

8. A valve comprising a body having an inlet to receive a fluid flow and an outlet for exiting the fluid flow, means for closing said outlet, a cylindrical polyjet sleeve extending along an axis between said inlet and outlet and provided with a plurality of openings therein of predetermined axial length arranged along said sleeve in circumferentially and axially spaced locations, a coaxial ring encompassing and bearing on said sleeve, means for relatively moving said ring and said sleeve axially, means on said ring constituting a solid portion thereof adapted in various axial positions of said ring to overlie and block some of said openings, means on said ring defining an annular groove of said predetermined axial length adapted in various different axial positions of said ring relative to said sleeve to communicate with only correspondingly different axially spaced ones of said openings in one direction to direct the fliud flow from said inlet to said outlet, means for directing fluid to flow through only one of said different ones of said openings in communication with said groove in an opposite direction when said outlet is closed regardless of the position of said sleeve relative to said groove, and means for conducting said fluid flow from said annular groove away from said valve.

* * * * *